United States Patent
Croston

(10) Patent No.: US 6,267,220 B1
(45) Date of Patent: Jul. 31, 2001

(54) FLANGE FEEDER FOR WOODEN I-BEAM ASSEMBLY MACHINE

(75) Inventor: Victor W. Croston, Port Orchard, WA (US)

(73) Assignee: Globe Machine Manufacturing Company, Tacoma, WA (US)

( * ) Notice: Subject to any disclaimer, the term of this patent is extended or adjusted under 35 U.S.C. 154(b) by 0 days.

(21) Appl. No.: 09/404,806

(22) Filed: Sep. 24, 1999

(51) Int. Cl.[7] .................................................. B21B 39/00
(52) U.S. Cl. ..................................... 198/339.1; 414/751.1
(58) Field of Search ........................... 198/339.1, 341.01, 198/341.05, 345.1; 414/785, 749.1, 751.1, 759.3

(56) References Cited

U.S. PATENT DOCUMENTS

| 4,407,630 | * | 10/1983 | Toda | 198/339.1 |
| 4,673,075 | * | 6/1987 | Ueyama et al. | 198/339.1 |

* cited by examiner

Primary Examiner—Kenneth W. Noland
(74) Attorney, Agent, or Firm—Lowe Hauptman Gilman & Berner, LLP

(57) ABSTRACT

A flange feeder utilizes a pair of left and right handed gripper assemblies mounted to an overhead horizontal transport drive to successively convey a pair of flange members into overhead vertical alignment with left and right handed infeed sections of a longitudinal conveyor leading into a chords and webs assembly machine. The pair of flanges are successively conveyed from a lateral flange conveyor into two or more sets of rotating grippers mounted on a common rotating shaft. The rotating grippers are positioned to clamp opposite sides of the flange member which is positioned in alignment therewith by means of stops located at the discharge end of the lateral conveyor. The clamped flange is then rotated upwards into vertical alignment with an open one of the left and right handed overhead grippers. Initially, the flange is fed into the right hand gripper and the left hand gripper is indexed into operative position as the rotating grippers return to grip a next in-line flange. The arrangement of the grippers to simultaneously grip or release a flange enables flange stock to be gripped, rotated, transported and then fed into the infeed conveyor in positively controlled and predictably oriented manner.

10 Claims, 3 Drawing Sheets

FLANGE FEEDER FOR WOODEN I-BEAM ASSEMBLY MACHINE

RELATED APPLICATIONS

The present application claims priority of a U.S. Provisional Application filed concurrently with the instant application on Sep. 24, 1999, entitled "FLANGE FEEDER FOR WOODEN I-BEAM ASSEMBLY MACHINE", the disclosure of which is incorporated by reference herein in its entirety.

1. Technical Field

The present invention relates generally to improved apparatus and methods of making wooden I-beams from a pair of wood flanges and web members interconnecting the flanges and, more particularly, to an improved flange feeder for conveying either pre-grooved or non-grooved flange members into an infeed section of the I-beam assembly machine.

2. Background Art

Fabricated wooden I-beams each comprising a pair of wooden flanges and web members having longitudinal edges received in grooves of the flanges are becoming increasingly popular due to the rising costs of sawn lumber and the scarcity of good quality wood capable of producing beams of large size. The fabricated wooden I-beams require less wood and also reduces the cost of transportation due to their lower weight. Wooden I-beams of this type have been disclosed extensively in the prior art with exemplary patents being U.S. Pat. Nos. 3,490,188; 4,074,498; 4,191,000; 4,195,462; 4,249,355; 4,336,678; 4,356,045; 4,413,459; 4,456,497; and 4,458,465.

Prior known procedures for forming fabricated wooden I-beams by gluing the members together have generally entailed the use of various conveyor and drive assemblies in which a series of webs are driven along a conveyor line in either spaced or end to end abutting relationship, with a pair of grooved flanges driven along opposite sides of the web conveyor. The flanges are driven with their grooves facing the webs and are gradually converged toward the conveyed webs so that the longitudinal web edges, usually pre-glued, enter the grooves to form an interconnecting glued joint therebetween.

FIG. 1 is a schematic plan view of a overall production line assembly for manufacturing wooden I-beams while FIGS. 2A and 2B are respectively elevational and top plan views of the wooden I-beam assembly of FIG. 1 for which the flange feeder of the present invention may be used to feed flanges 12A and 12B into the assembly line 10. These drawing illustrations are taken from U.S. Pat. No. 5,633,303 which issued to William M. Owens and Victor Croston on Jan. 11, 1996, the '303 patent being assigned to Globe Machine Manufacturing Company of Tacoma, Washington, the assignee of the present invention herein. The '303 patent is incorporated herein in its entirety by reference.

More specifically, FIG. 1 is an illustration of an overall production area P utilizes assembly line 10 for making wooden I-beams having wood flanges or chords 12A and 12B ("flange(s)" and "chord(s)" are used interchangeably throughout this specification) and wooden web member 14. The assembly line or machine 10 performs different operations to secure the identical flanges 12A,12B to the series of webs 14 to form web-to-chord joints. Each web 14 is preferably formed of plywood or oriented strand board ("OSB") which is a form of flakeboard wherein strains of wood are oriented, overlapped and secured together by suitable glues to achieve strength properties superior to plywood or the like. The webs 14 may be of varying thickness and, in the assembled wooden I-beams, form a plurality of abutted sheets of such boards. The sheets 14 are rectangular having a long dimension along a longitudinal axis which is substantially parallel to the longitudinal axes of the elongated flanges 12A,12B. The webs 14 form butt joints with one another preferably secured together with adhesive or glue.

Each flange 12A,12B has a generally rectangular or square cross-section perpendicular to its longitudinal axis. The flanges 12A,12B may be formed of commercially available wooden structural boards or may be formed of laminated veneer lumber ("LVL") which is readily available in a large variety of lengths and thicknesses. The flanges are cut from rectangular stock material and provided with grooves either off the assembly line 10 at a flange forming area in a known manner, or within the assembly line as described in the aforementioned '303 patent. The flanges are discharged onto an outfeed table for transfer to a flange feed location via a lateral conveyor ramp. The flanges are respectively grouped on opposite sides of a roll case 16 for feeding into the assembly machine 10 along opposite left and right hand sides thereof.

The individual web members 14 are pre-cut to desired length and width and undergo a beveling operation whereby the upper and lower longitudinal edges are beveled or tapered to respectively interfit with the flange grooves as described in the '303 patent. The grooves preferably have the same cross-section as the web beveled edges or may have other cross-sections as known in the art. The web forming steps may occur off-line, as known in the art, in a web-forming area generally designated by reference letter W. In that area, the web-to-web joints are also profiled. The formed webs 14 are conveyed to the assembly machine 10 for positioning as a stack within a web hopper located downstream from the flange infeed location.

The flanges 12A,12B are conveyed respectively along the opposite sides of the webs 14 which is formed as a continuous web in the assembly line 10. The flanges 12A,12B are gradually converged (in the area downstream from section lines 14—14 in FIG. 2B) toward the continuous web 14 so that the beveled edges enter the grooves to form press-fitted interconnecting joints therebetween and thereby the wooden I-beam. The beveled edges and grooves are preferably glued prior to joining. The wooden I-beam may optionally be passed through a radio frequency tunnel as is well know which cures the glued joints of the I-beam. The I-beam is discharged onto an outfeed table provided with a flying cut-off saw 16 cutting the beam to desired length. The cut beams are transferred laterally from the outfeed table by means of a cross transfer conveyor C which provides a minimum cure dwell time before the beams are ultimately stacked and bundled at station B for subsequent shipment.

In the aforementioned web assembly machine, as well as other web assembly machines of which I am aware, it is important to provide a continuous supply of elongated flanges 12A,12B into the flange infeed area so that these flanges may be successively fed into the left and right hand sides of the machine with a minimal gap between the trailing edge of one fed flange and the leading end of the next in-line fed flange. Control over the gap distance between these successively spaced trailing and leading ends is important to ensure that the flange infeed drive can properly accelerate these ends into abutting contact before they are permanently joined to the web edges to form the assembled machine.

In the prior art flange infeed assemblies of which I am aware, overhead guide chutes or channels are used to drop successively fed flanges in the left and right hand sides of the flange infeed area to create a series of stacked flanges as a result of the waterfall or cascading effect. Unfortunately, as a result of the flanges being fed through these individual curved overhead guide chutes, the flanges tended to twist causing the trailing end thereof to bind or jam in the overhead chute or the channel therebelow which necessitated considerable down time while the jam was manually cleared.

As a result of the stacking of the flanges on top of each other at both the left and right hand sides of the machine, considerable pressure was placed on the bottommost flanges from the weight of the stacked flanges making it difficult if not impossible to accelerate the flange in the infeed flange drive from underneath the stack. Consequently, problems with closing the gaps between the flanges were frequent and often resulted in commercially unacceptable product.

Other flange infeed systems have also been tried. In one such system, flanges were conveyed to the flange infeed area of the chords and webs assembly machine and air cylinders were used to push the bottom flanges sideways from out of the stack and into contact with pinch drive wheels that fed the individual flanges into the chords and webs assembly machine. As a result of the delayed reaction time of the firing cylinders, not to mention the difficulties associated with driving the bottom flanges sideways from out of the stack into contact with the pinch wheels, this type of infeed flange drive mechanism also resulted in difficulties associated with closing the gaps between the trailing and leading edges of the successively fed flanges.

SUMMARY OF THE INVENTION

It is accordingly one object of the present invention to reliably feed successive flanges into a chords and webs assembly machine with minimal formation of gaps between the successive flanges in the finally formed I-beam product.

Another object of the invention is to reliably transfer flanges onto conveyors which feed the flanges lengthwise into the forming or assembly machine.

Another object is to positively control flanges in a predictably oriented manner so that the flanges are released onto the infeed conveyor leading into the assembly machine with constant and closeable gaps between successively fed flanges by elimination of stacking forces that otherwise adversely affect flange transfer into the machine in a predictable manner.

Apparatus for feeding elongated wooden flange members into a production line assembly machine that joins opposite longitudinal edges of a train of planar wooden web members into glued contact with said flange members comprises, in accordance with the present invention, a lateral conveyor for conveying a plurality of the elongated wooden flange members to an infeed location. A longitudinal conveyor having left and right hand conveyor sections is located adjacent the lateral conveyor to define the infeed location for receiving the flange members. A first gripper assembly is positioned between the lateral and longitudinal conveyors and is movable into a first position to grip one flange member received from the lateral conveyor and is further movable into a second position to transfer the gripped flange member away from the lateral conveyor. A second gripper assembly has a pair of left and right hand grippers that are movably mounted to each receive a gripped flange member from the first gripper assembly.

A first drive mechanism is mounted to move the first gripper assembly between the first and second positions. A second drive mechanism is mounted to laterally convey the second gripper assembly between a first location corresponding to the second position of the first gripper assembly and a second location wherein the left and right grippers are in respective alignment with the left and right hand longitudinal conveyor sections.

A first gripper actuating mechanism is arranged to open and close the first gripper assembly in coordinated movement with the second gripper assembly. A second gripper actuating mechanism is arranged to open and close the second gripper assembly in coordinated movement with the first gripper assembly at the first location and to discharge the gripped flange members onto the left and right hand longitudinal conveyor sections at the second location.

The first gripper assembly preferably includes at least one pair of gripping fingers interconnected to form a pair of jaws movable by the first gripper actuating mechanism between open and closed positions.

In the preferred embodiment, the lateral infeed conveyor is typically a chain conveyor used to transport and crowd side moving flange members which are transported on a side thereof from an off-board system. The lateral infeed conveyor has fixed mechanical stops to assure proper sideways orientation of the flange stock to the awaiting first gripper assembly. Sensors confirm alignment with these stops before allowing operation of the first gripper assembly from the first position into the second position. Preferably, the lateral infeed conveyor is momentarily paused as the first gripper assembly removes the flange against the stops to relieve pressure from the adjoining flanges.

As the term is used herein, "gripper" or "grippers" are used to describe devices which mechanically duplicate the action of a human hand and are therefore capable of alternately moving between an open position (e.g., flat hand) and a closed position (hand closed to grip between the thumb and opposing fingers). The preferred embodiment utilizes devices which open and close to grip by way of internal pneumatic power. However, it is to be understood that electric solenoids, hydraulic power, or mechanical operation via cams or other mechanical methods can also be used.

It is to be further understood that "gripper assembly" can be used to designate a plurality of identical grippers mounted at longitudinally spaced intervals in parallel to the longitudinal conveyor so that these identical grippers can engage the same flange member along longitudinally spaced intervals thereof.

It is to be further understood that grippers performing a common function (e.g., the first gripper assemblies, the second gripper assemblies, etc.) are opened and closed by a common sequence so as to simultaneously grip or release a flange (or two or more flanges presented sideways, end to end, to the machine). Grippers of a common use are therefore mounted "in-line" to grip, rotate, transport and drop the flange stock in a positively controlled and predictably oriented manner.

The first gripper assembly preferably comprises two or more sets of grippers mounted at longitudinally spaced intervals on a rotating shaft so as to accept flange members from the infeed lateral conveyor. Once the grippers are positioned around a flange member disposed against the stops, the grippers close to grip the flange and are then rotated 90° upwards to an awaiting set of right hand ones of the second gripper assembly. The grippers of the right hand second assembly grip the flange which is then released by the first gripper assembly. The first assembly is now opened and rotated back downwards to receive the next in-line flange that has subsequently moved into position against the stops. As this occurs, the left hand second grippers are indexed into alignment with the first grippers which now rotate the next in-line flange upwards.

The second gripper assembly is mounted to an overhead transport mechanism that drives the left and right hand second grippers into indexed positions directly above the vertical position of the first or rotating grippers. The rotating grippers sequence to present a flange to the first gripper assembly which closes prior to the first or rotating grippers opening and returning for the next in-line flange. After the rotating or first gripper fingers have opened, the horizontal transport drive moves sideways to position the left hand second gripper assembly in the previous position of the right hand second gripper assembly to thus ready the left hand assembly to accept the second flange. The rotating grippers sequence to grip a second flange from the infeed conveyor and return it to the vertical position to present this flange to the left hand second gripper assembly which then closes to hold the flange. After the flanges are gripped by the left and right hand second gripper assemblies, and the rotating grippers have opened, the horizontal transport drive moves the two flanges via the second gripper assembly to a position directly above the left and right hand conveyor sections of the flange longitudinal or outfeed conveyor, preferably into overhead alignment with two left and right handed channel slots defining the conveyor positions.

When sensors indicate that the previously fed left and right hand flanges are clear of the area directly beneath the flanges now gripped by the left and right hand second gripper assemblies, the left and right hand second gripper assemblies are opened and the flanges fall free of the grippers and are guided into the channel slots to contact the respectively left and right hand longitudinal conveyor sections. The now open left and right hand second gripper assemblies are then returned by the horizontal transport drive to the position ready to sequentially accept the next pair of flanges with the right hand flange already disposed in the vertical position of the first grippers which have been independently moved to obtain the next in-line flanges.

In accordance with other features of the invention, sensors are placed at the leading edge of the outfeed end of the longitudinal conveyor so as to allow independent dropping of the left and right hand flanges when the area below the flanges is clear. The horizontal transport drive is sequenced to return only after both flanges have been dropped.

In the preferred embodiment, the outfeed longitudinal conveyor preferably utilizes two independently driven belt conveyors which receive power from left and right hand hydraulic infeed drives of the assembly machine described, for example, in the '303 patent incorporated by reference herein. Drive mechanism ratios assure a predictable overspeed of the left and right handed outfeed longitudinal conveyors to close the small gaps formed during the time needed to drop and accelerate the next set of flanges. The separate left and right hand drives also allow independent loading of one flange at a time. The outfeed longitudinal conveyor can be made to function equally well with conveyor rolls and/or pinch wheel drives. The distance between the outfeed conveyors (i.e., the lateral spacing between the "drop zones" of the left and right hand second gripper assemblies) is pre-set for a fixed and average width of the downstream assembly process. Pivoted troughs downstream of the flange feeder of the invention act to bridge and guide the flanges inwards or outwards to compensate for various process widths.

The preferred embodiment incorporates manual, semiautomatic and fully automatic functions to allow complete control by the operator, or by totally automatic sequencing and interlocking. A PLC (Programmable Logic Controller) is provided to control all grippers and the infeed conveyors. The horizontal transport drive incorporates an AC servo and common drive shaft to the two or more left and right handed second gripper assemblies for smooth, rapid and accurate movement of the left and right handed second grippers to their pickup and drop position. Horizontal transport can be achieved with cylinders, hydraulic drive motors, or other types of electric drives.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1:
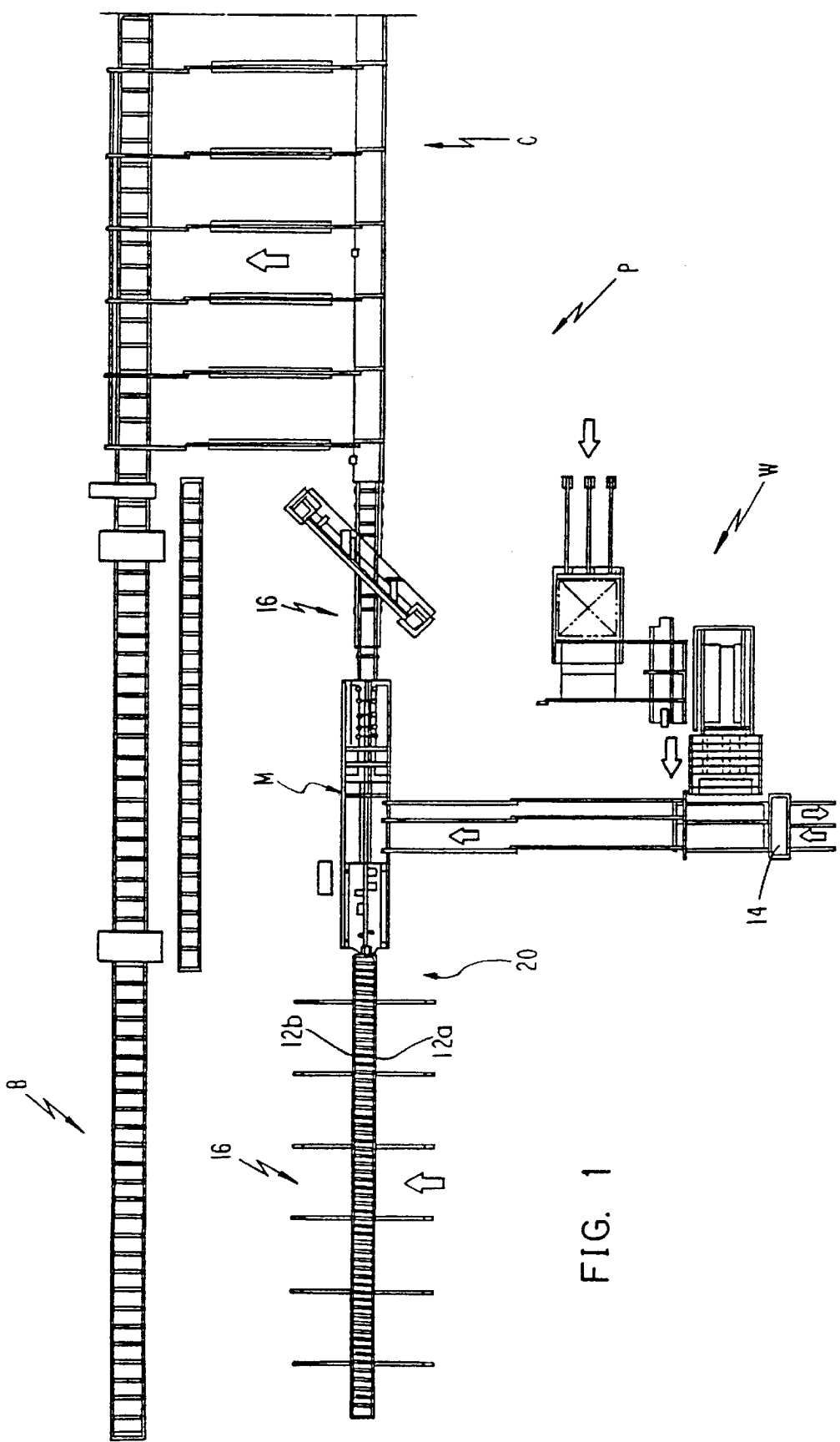
FIG. 1 is a schematic plan view of an overall production line assembly for manufacturing wooden I-beams.
Figure 2:
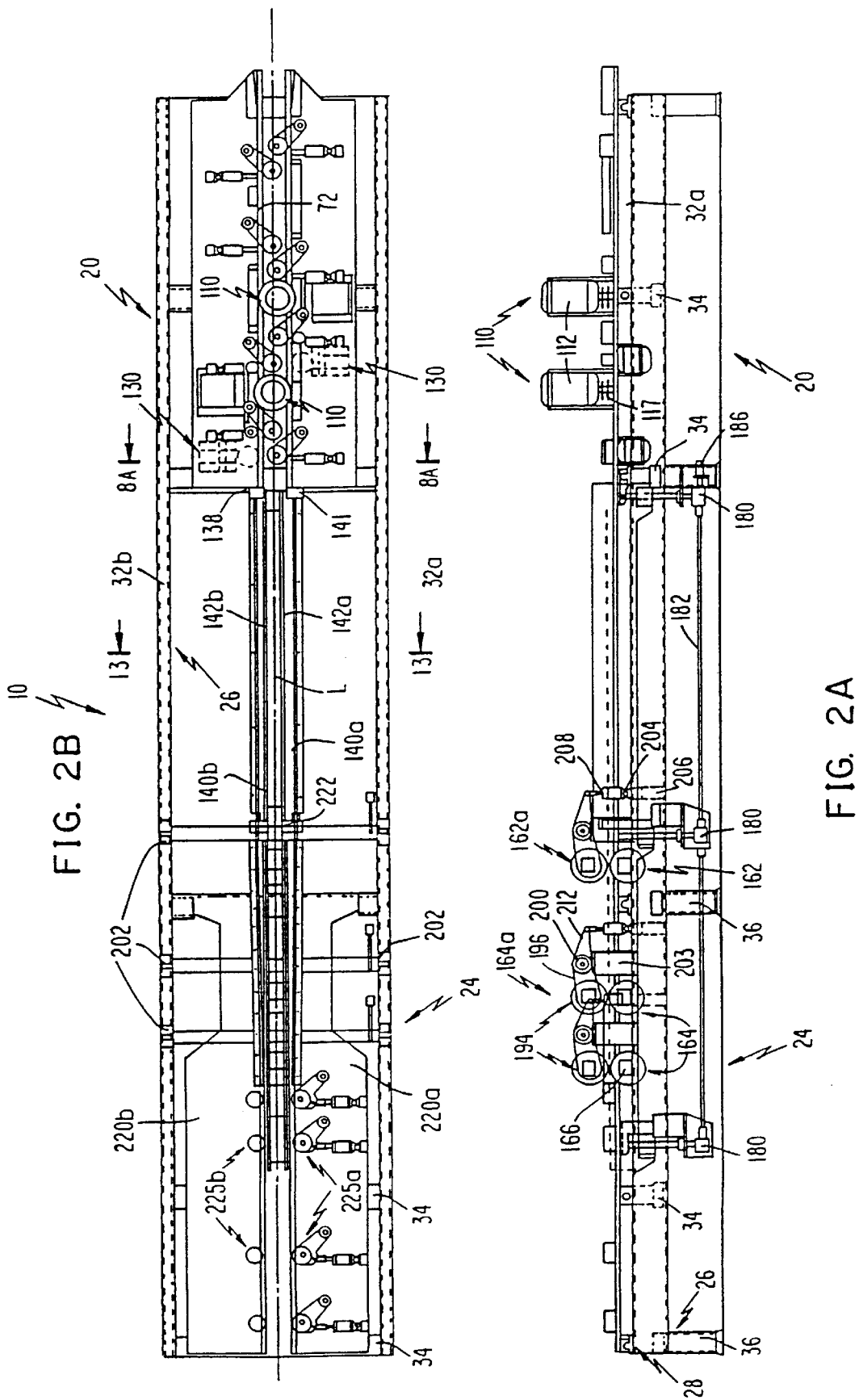
FIG. 2A is an elevational view of the wooden I-beam assembly of FIG. 1.
FIG. 2B is a top plan view of the wooden I-beam assembly of FIG. 1.
Figure 3:
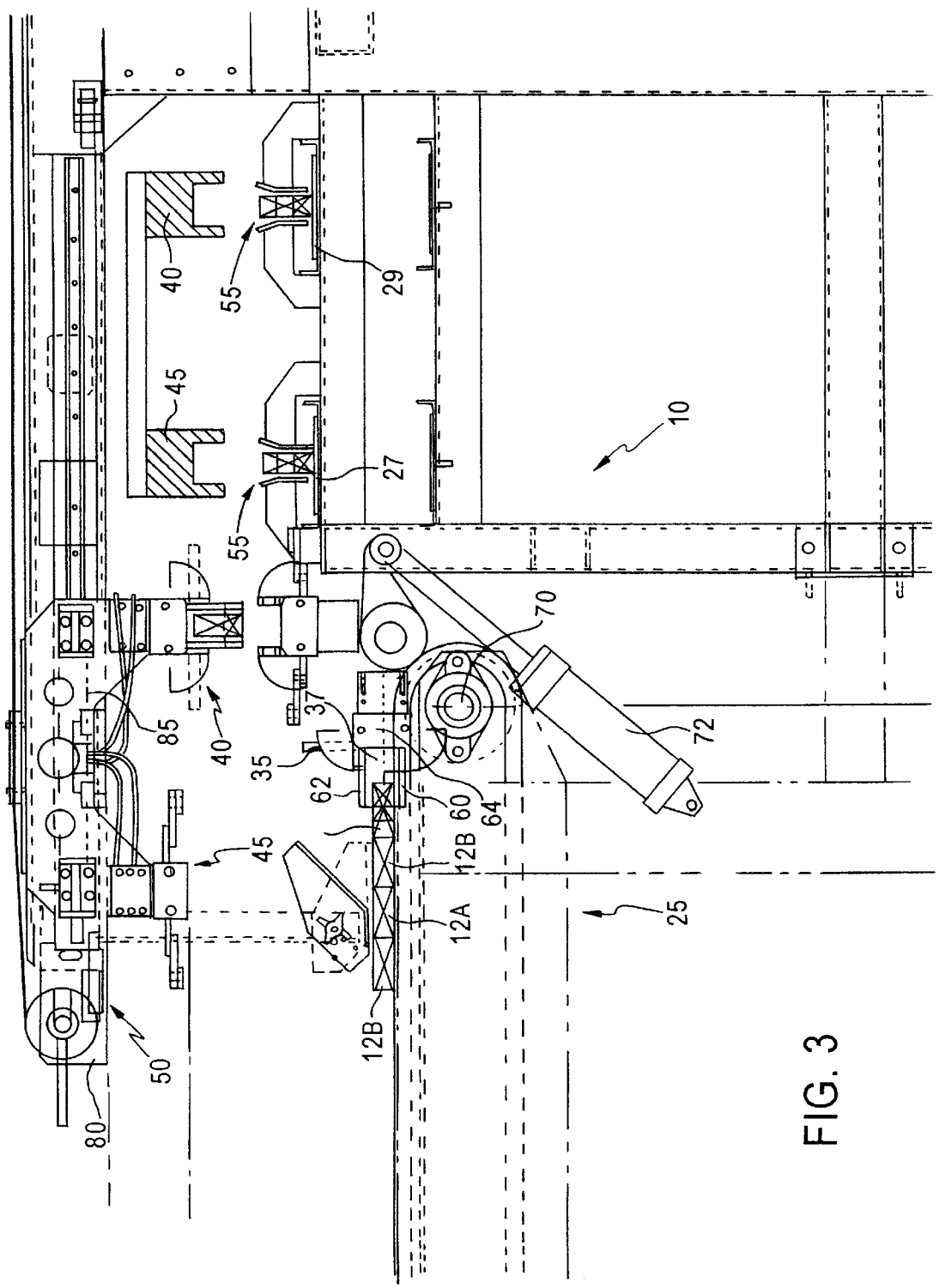
FIG. 3 is a cross-sectional elevational view of the flange feeder in accordance with a preferred embodiment of the present invention.

FIG. 3 is an illustration of a unique flange feeding of the invention, generally designated with reference numeral 10, having a basic function of handling flange stock 12A,12B used in the production of manufacturing wooden I-beams of the type disclosed in the aforementioned '303 patent. The flange feeder 10 would be located upstream from flange infeed area 20 in FIG. 1 (in place of roll case 16) to deliver square or rectangular wood flanges 12A,12B, being provided from a lateral infeed chain conveyor 25 in a side flowing manner (typically by chain or belt conveyor) for transport in the unique manner described below into left and right handed flange infeed longitudinal conveyors 27 and 29 respectively which feed the flanges 12A,12B lengthwise into the assembly machine M. The foregoing flange infeed movements are achieved with a first or rotating gripper assembly 35 located at longitudinally spaced intervals and adapted to open and close in a common sequence so as to simultaneously grip or release a flange 12A,12B. In the first position of the rotating gripper assemblies 35 (the term "assembly" is intended to denote either single or multiple assemblies), a flange 12A or 12B is gripped by the rotating grippers and removed from a holding position against a plurality of in-line stops 37 located at the discharge end of the lateral conveyor 25. The rotating gripper assemblies 35 then rotate 90° upwards into vertical alignment with a right hand second gripper assembly 40 which is initially in the open position (see phantom lines). The right hand second gripper assembly 40 is mounted to a horizontal transport drive 50 and clamps onto the raised flange 12A. As this occurs, the rotating grippers 35 open and are then rotated downward in the open position to clamp against opposing sides of a next in-line flange 12B. As this return movement occurs, a left hand second gripper assembly 45, also mounted to the horizontal transport drive mechanism 50 for movement together with the right hand second gripper assembly 40, is indexed into the vertical position to receive the next in-line flange 12B from the rotating grippers 35 which have now rotated into the upper position. Following the same type of exchange, the horizontal transport drive mechanism 50 moves both the left and right hand second gripper assemblies 45,40 into respective vertical alignment with chutes 55 defining the left and right hand infeed conveyor sections 27,25 of the longitudinal infeed conveyor. The left and right hand second grippers 45,40 are opened to allow the flanges 12A and 12B to be dropped into the respective chutes 55. The horizontal transport drive 50 is then sequenced to repeat the cycle only after both flanges 12A,12B have been dropped and will not drop the next in-line set of flanges until the in-line flanges have cleared the left and right hand infeed conveyor sections 27,29.

As mentioned above, the lateral infeed chain conveyor 25 is used to transport and crowd (i.e., remove gaps therebetween) side moving flange stock 12A,12B, etc., which is preferably transported on its wide flat side from an off-board system (not shown). The lateral conveyor 25 has the fixed mechanical stops 37 against which a short side of the lead flange 12A or 12B abuts to assure proper sideways orientation of the flange stock to await the rotating grippers 35. Sensors (not shown) are provided to confirm alignment of the next flange with the stops 37 before allowing the grippers 35 to rotate into clamped engagement in the first position.

Each first or rotating gripper assembly 35 is comprised of a pair of elongate fingers 60 and 62 pivotally connected to a support block 64 for air servo controlled movement between open and closed positions. In the open position depicted in phantom line in FIG. 3, the fingers 60,62 simulate a flat hand (i.e., the fingers extend upward and downward in a coplanar arrangement with each other) and, in a closed position depicted in solid line in FIG. 3, the fingers simulate a hand closed to grip between the thumb and opposing finger(s). Thus, in the closed position, the finger pair 60,62 of each rotating gripper assembly 35 is closed to exert a clamping pressure against the top and bottom opposing wide faces of the flange 12A or 12B.

The aforesaid construction of the above described gripper fingers 60,62 is applicable to each of the longitudinally spaced in-line gripper assemblies in both the rotating gripper assembly 35 as well as each of the left and right hand overhead assemblies 40,45 connected to the horizontal transport drive 50. In the preferred embodiment, each pair of gripper fingers 60,62 is opened and closed to grip by means of internal pneumatic power in which compressed air is provided through appropriate valving to open and close the grippers having a common use to thereby grip, rotate, transport and drop the flange stock 12A,12B in a positively controlled and predictably oriented manner. Although internal pneumatic power is used in the preferred embodiment, it is to be understood that electric solenoids, hydraulic power, or mechanical operation via camming or other mechanical methods can be used as will occur to persons skilled in this art.

Two or more sets of rotating gripper assemblies 35 are preferably mounted on a rotating shaft 70 in a longitudinally spaced manner such as to accept flanges 12A or 12B from the infeed conveyor 25, then closed to grip the flange, and then rotated 90° upwards as a result of corresponding shaft rotation preferably using an appropriately controlled series of in-line air fired cylinders 72. In the second or raised position of the rotating grippers 35, the flange 12A or 12B is now oriented with the wide parallel faces extending in a vertical direction. The right hand ones 40 of the second gripper assemblies are in vertical alignment with the flange 12A or 12B and the fingers 60,62 thereof are in the open position to provide adequate clearance for the gripped flange to be rotated upwards beneath the awaiting set of open fingers. At this point, after a sensor senses the raised position of the flange 12A, the fingers of the right gripper assemblies 40 close to respectively contact and grip the wide faces of the flange. Once this occurs, the lower fingers 60,62 of the elevated rotating gripper assemblies 35 open and a command is given to fire the cylinders 72 to reversely rotate the shaft 70 for return of the rotating gripper assemblies into their first or lower position.

It is to be noted that the lateral infeed conveyor 25 is preferably momentarily paused as the rotating grippers 35 remove the flange 12A or 12B from against the stops 37 in order to relieve pressure from the adjoining flanges.

As the rotating grippers 35 are returned to the lower position to engage the next in-line flange 12B (now advanced by the conveyor 25 into position against the stops 37), the horizontal transport drive mechanism 50 is indexed to advance the two or more sets of left hand inline gripper assemblies 45 into the position previously occupied by the right hand gripper assemblies 40. Thus, the left hand gripper assemblies 45 wait with their fingers 60,62 open to be positioned directly above the upper vertical position of the rotating gripper assemblies 35 after they are rotated to their overhead location. The same sequence of opening and closing of the fingers 60,62 occurs to transfer the next in-line flange 12B to the left hand gripper assemblies 45.

After the flanges 12A,12B are gripped by the left and right hand second gripper assemblies 45,40 and the rotating grippers 35 have opened, the horizontal transport drive So then moves the two flanges 12A,12B to positions directly above the left and right channel slots 50 respectively located above the left and right longitudinal conveyor sections 27,29. When sensors (not shown) indicate that the previously fed flanges are clear of the area directly below the flanges 12A,12B now being gripped by the left and right second gripper assemblies 45,40, the left and right gripper assemblies are commanded to open whereupon the flanges fall free of the grippers and are guided by the channel slots 50 to contact the respective outfeed conveyor sections. The now open left and right second gripper assemblies 45,40 are then returned by the horizontal transport drive 50 to the position ready to accept the next flange from the rotating grippers 35 which, in the meanwhile, are operated to independently obtain the first 12A of the next two flanges 12A,12B to be fed.

As mentioned above, sensors are placed at the leading or downstreammost edge of the outfeed end of the longitudinal conveyor 27,29 so as to allow independent dropping of the left and right flanges 12A,12B when the area below these flanges is clear. The horizontal transport drive 50 is sequenced to return only after both flanges 12A,12B have been dropped.

The longitudinal outfeed conveyor, in the preferred embodiment may utilize the two independently driven belt conveyors 27,29 which receive their power from the left and right hand hydraulic infeed drives of the assembly machine 10 described in the '303 patent. Drive mechanism ratios assure a predictable overspeed of these outfeed conveyors 27,29 to close the small gaps formed during the time needed to drop and then accelerate the next in-line set of flanges. The separate left and right hand drives 27,29 also allow independent loading of one flange 12A,12B at a time. Outfeed conveyors could also be made to function equally well with conveyor rolls and/or pinch wheel drives. The lateral distance between the outfeed conveyors is set for an average width of the downstream assembly process and pivoted troughs (not shown in detail but the structure of which will be known to persons skilled in the art) downstream of the flange feeder 10 act to bridge and guide the flanges inwards or outwards to compensate for various process width.

The horizontal transport drive 50 includes a series of longitudinally spaced horizontally laterally extending supports 80 individually supporting a movable carriage 85 from which the left and right hand second gripper assemblies 45,40 extend. These carriages 85 may be uniformly controlled through a multiplicity of different movement mechanisms to ensure the smooth, rapid and accurate movement of the overhead gripper assemblies 40,45 between their aforementioned pickup and drop positions. In the preferred embodiment, the horizontal transport drive 50 incorporates an AC servo and a common drive shaft to laterally move the gripper assemblies although other mechanisms can be used.

A PLC (Programmable Logic Controller) is preferably provided for controlling all grippers and the lateral infeed conveyor to achieve the detailed functionalities in the manner described above. Consequently, it will be appreciated that the flange feeder 10 of the invention may incorporate manual, semi-automatic, and fully automatic functions to allow complete control by an operator or enable total automatic sequencing and interlocking.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. Apparatus for feeding elongated wooden flange members into a production line assembly machine that joins opposite longitudinal edges of a train of planar wooden web members into glued contact with said flange members, comprising:
   (a) a lateral conveyor for conveying a plurality of said elongated wooden flange members to an infeed location;
   (b) a longitudinal infeed conveyor having left and right hand conveyor sections located adjacent the lateral conveyor for receiving said flange members;
   (c) a first gripper assembly positioned between said lateral and longitudinal conveyors and being movable into a first position to grip one flange member received from the lateral conveyor and into a second position to transfer said gripped flange member away from said lateral conveyor;
   (d) a second gripper assembly having a pair of left and right hand grippers movably mounted to each receive a gripped flange member from the first gripper assembly;
   (e) a first drive mechanism mounted to move the first gripper assembly between the first and second positions;
   (f) a second drive mechanism mounted to laterally convey the second gripper assembly between a first location corresponding to the second position of the first gripper assembly and a second location wherein the left and right hand grippers are in respective alignment with the left and right hand longitudinal conveyor sections; and
   (g) a first gripper actuating mechanism arranged to open and close the first gripper assembly in coordinated movement with the second gripper assembly, and a second gripper actuating mechanism arranged to open and close the second gripper assembly in coordinated movement with the first gripper assembly at the first location and to discharge the gripped flange members onto the left and right hand longitudinal conveyor sections at the second location.

2. The flange feeding apparatus of claim 1, wherein said first gripper assembly includes at least one pair of gripping fingers interconnected to form a pair of jaws movable by said first gripper actuating mechanism between open and closed positions.

3. The flange feeding apparatus of claim 2, wherein said first drive mechanism is operable to rotate the first gripper assembly from said first to said second position.

4. The flange feeding apparatus of claim 3, wherein an axis of rotation of said first gripper assembly extends parallel to the longitudinal axis of the longitudinal infeed conveyor.

5. The flange feeding apparatus of claim 4, wherein said first and second positions are spaced 90° from each other.

6. The flange feeding apparatus of claim 4, wherein in the first position, the first gripper assembly is positioned to clamp against opposite faces of one flange member resting against a stop positioned at laterally downstream location relative to the lateral conveyor.

7. The flange feeding apparatus of claim 6, wherein, in the second position, the first gripper assembly is pivoted into a vertical orientation to successively feed a gripped flange member to each of the left and right hand grippers of the second gripper assembly as a result of indexing lateral movement of the left and right grippers into successive vertical alignment with the first gripper assembly in the second position.

8. The flange feeding apparatus of claim 1, wherein the left and right hand sections of the longitudinal infeed conveyor are independently driven in synchronous movement with each other.

9. The flange feeding apparatus of claim 1, wherein said second gripper assembly is mounted in an overhead location relative to the longitudinal infeed conveyor.

10. The flange feeding apparatus of claim 1, further comprising control means operatively connected to each of the first and second gripper actuating mechanisms and the first and second drive mechanisms for initiating the following sequence of movement:
   (i) locating the first gripper assembly in the first position in an open position;
   (ii) closing the first gripper assembly to clamp against opposite sides of a flange;
   (iii) rotating the first gripper assembly from the first position vertically upward into the second position;
   (iv) positioning the right hand one of the grippers of the second gripper assembly into vertical overhead alignment with the vertically upward oriented first gripper assembly in the second position;
   (v) closing the right hand gripper on the flange member;
   (vi) opening the first gripper assembly to release the same from the now transferred flange clamped in the right hand gripper;

(vii) rotating the first gripper assembly into the first position so that it is open around a next in-line flange and then closing the first gripper assembly into clamped engagement with said next in-line flange while the second gripper assembly is indexed to locate the left hand second gripper in vertical alignment with the second position of the first gripper assembly to receive the next in-line flange;

(viii) moving the second gripper assembly to position the left and right hand second grippers into respective overhead alignment with the left and right hand conveyor sections of the longitudinal infeed conveyor; and (ix) opening the left and right hand second grippers to release the left and right hand flanges onto the respective left and right hand longitudinal conveyor sections.

* * * * *